(12) United States Patent
Tipp et al.

(10) Patent No.: US 9,846,316 B2
(45) Date of Patent: Dec. 19, 2017

(54) VENT ARRANGEMENT FOR EYEGLASS FRAMES

(71) Applicant: Under Armour, Inc., Baltimore, MD (US)

(72) Inventors: Alan Scott Tipp, Elkhorn, NE (US); Jonathan Michael Martin, Covington, KY (US); Adam Harris Kaufer, Cutchogue, NY (US); Kort Neumann, Oak Grove, OR (US)

(73) Assignee: Under Armour, Inc., Baltimore, MD (US)

( * ) Notice: Subject to any disclaimer, the term of this patent is extended or adjusted under 35 U.S.C. 154(b) by 51 days.

(21) Appl. No.: 14/658,027

(22) Filed: Mar. 13, 2015

(65) Prior Publication Data

US 2016/0231599 A1 Aug. 11, 2016

Related U.S. Application Data

(63) Continuation-in-part of application No. 14/616,265, filed on Feb. 6, 2015.

(51) Int. Cl.
*G02C 11/08* (2006.01)

(52) U.S. Cl.
CPC .......... *G02C 11/08* (2013.01); *G02C 2200/08* (2013.01)

(58) Field of Classification Search
CPC ... G02C 1/04; G02C 1/06; G02C 1/10; G02C 11/00; G02C 11/08

USPC ........................................ 351/62; 2/435–438
See application file for complete search history.

(56) References Cited

U.S. PATENT DOCUMENTS

| 4,240,718 | A | * | 12/1980 | Wichers | ................. | G02C 3/003 |
| | | | | | | 351/111 |
| 4,955,706 | A | | 9/1990 | Schmidthaler | | |
| 5,363,512 | A | | 11/1994 | Grabos | | |
| 6,050,684 | A | | 4/2000 | Mage | | |
| 6,971,745 | B2 | * | 12/2005 | Sheldon | ................... | G02C 1/06 |
| | | | | | | 2/435 |
| 2007/0252943 | A1 | * | 11/2007 | Welchel | ................. | G02C 11/08 |
| | | | | | | 351/62 |
| 2010/0118258 | A1 | * | 5/2010 | Quintana | ................ | A61F 9/027 |
| | | | | | | 351/62 |
| 2014/0063438 | A1 | | 3/2014 | Cater et al. | | |

FOREIGN PATENT DOCUMENTS

WO 9624315 A1 8/1996

\* cited by examiner

*Primary Examiner* — Huy K Mai
(74) *Attorney, Agent, or Firm* — Maginot, Moore & Beck LLP

(57) ABSTRACT

Eyeglasses include rims, at least one temple member connected to the rims, and at least one lens with a perimeter edge. The perimeter edge of the lens includes an upper perimeter edge, a lateral perimeter edge, a lower perimeter edge, and a medial perimeter edge. The rims are configured to retain the at least one lens with the upper perimeter edge of the lens engaging the rims. A vent arrangement is provided between the lens and the rims. The vent arrangement includes an opening between a lateral side of the rims and the lateral perimeter edge of the lens.

20 Claims, 11 Drawing Sheets

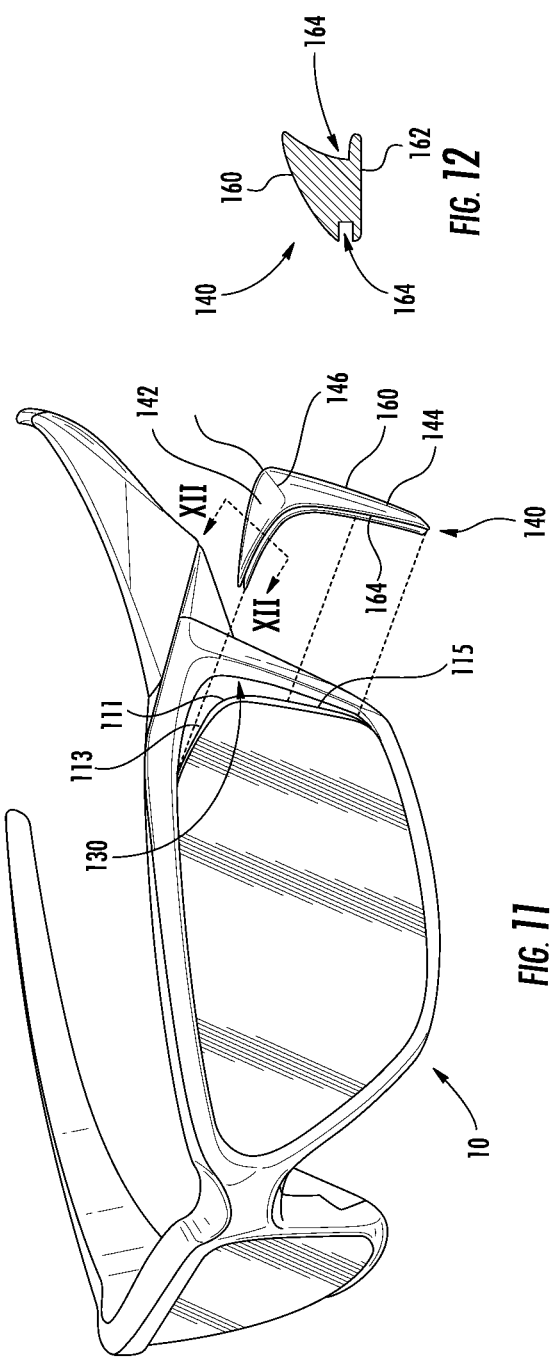

VENT ARRANGEMENT FOR EYEGLASS FRAMES

CROSS-REFERENCE TO RELATED APPLICATIONS

This application is a continuation-in-part of U.S. patent application Ser. No. 14/616,265, filed Feb. 6, 2015.

FIELD

This document relates to the field of eyeglasses, and particularly to ventilation arrangements for eyeglass frames.

BACKGROUND

Eyeglasses have been used for hundreds of years to provide vision assistance to wearers. Eyeglasses typically comprise a frame (which may also be referred to herein as "frames") configured to retain a lens (or "lenses"). The frame includes a face member including two eyewires or rims that hold the lenses. A bridge that connects the two rims. The bridge may include a nosepiece that allows the rims to rest more comfortably on a wearer's nose. A temple member extends from the lateral side of each rim. The temple member is designed to extend rearwardly on the head of the wearer and over the ears in order to provide a resting position for the eyeglasses on the face of the wearer.

Eyeglasses provide vision assistance to the wearer in various ways. Prescription lenses provide corrective vision for the wearer, assisting the wearer in seeing near or distant objects more clearly. Eyeglasses may also provide protection for the eye of the wearer, including protection from wind or from flying debris. Eyeglasses with light blocking features are commonly referred to as sunglasses. Sunglasses may or may not include corrective lenses, but provide the benefit of blocking bright or excessive light from the eyes of a wearer.

Sunglasses may be particularly useful for a wearer participating in athletic events. In these situations, the glasses should provide vision benefits including protection from light, wind and other elements. Additionally, sunglasses for athletic events typically are typically designed to cover a wide field of vision, including both central and peripheral vision of the wearer. Accordingly, the lenses for sunglasses tend to extend across a relatively large area covering the eyes of the wearer. Often, these lenses are retained relatively close to the wearer's face in order to further limit the amount of direct light reaching the eyes of the wearer. Unfortunately, these relatively large lenses worn close to the face limit the amount of airflow across the interior surface of the lenses. This reduced airflow across the rear of the lenses results in fogging when condensation is formed on the rear surface of the lenses. Fogging of the lenses is particularly problematic in high humidity conditions, or when the athlete is perspiring.

Various arrangements have been used in the past to avoid lens fogging. For example, many sunglasses incorporate ventilation features designed to allow heat to escape from the space between the lens and the face of the wearer. Some ventilation arrangements also encourage airflow through the space between the lens and the face of the wearer. Unfortunately, these ventilation features tend to allow additional light to reach the eyes of the wearer, thus reducing the effectiveness of the sunglasses. Additionally, while ventilation is sometimes useful for a wearer, there are occasions when the ventilation may be counter-productive. For example, in high wind conditions additional ventilation may result in too much airflow across the eyes of the wearer, thus drying the eyes and generally resulting in discomfort to the wearer.

In view of the foregoing, it would be advantageous to provide sunglasses and other eyeglasses that are configured to reduce fogging without allowing a significant amount of additional light to pass through the sunglasses to the eyes of the wearer. It would also be advantageous if ventilation features provided by the sunglasses were configured to keep airflow from flowing across the eyes of the wearer. Additionally, it would be desirable if the anti-fogging and ventilation features were inconspicuous on the eyeglasses and seamlessly incorporated into other functional and aesthetic features of the eyeglasses.

SUMMARY

In accordance with one exemplary embodiment of the disclosure, eyeglasses include rims, at least one temple member connected to the rims, and at least one lens with a perimeter edge. The perimeter edge of the lens includes an upper perimeter edge, a lateral perimeter edge, a lower perimeter edge, and a medial perimeter edge. The rims are configured to retain the at least one lens with the upper perimeter edge of the lens engaging the rims. A vent arrangement is provided between the lens and the rims. The vent arrangement includes an opening between a lateral side of the rims and the lateral perimeter edge of the lens.

Pursuant to another exemplary embodiment of the disclosure, there is provided eyeglasses including at least one lens with a perimeter edge. The perimeter edge includes an upper perimeter edge, a lateral perimeter edge, a lower perimeter edge, and a medial perimeter edge. Rims are configured to retain the lens, and at least one temple member is connected to the rims. The rims include an upper side with an upper groove, a medial side, and a lateral side. The rims further include a groove configured to receive the lens. The groove extends along the upper side of the rims such that the upper perimeter edge of the lens is positioned in the groove. The groove does not extend along the lateral side of the rims such that the lateral perimeter edge of the lens is not positioned in the groove. An opening is provided between the lateral side of the rims and the lateral perimeter edge of the lens.

According to yet another exemplary embodiment of the disclosure, eyeglasses comprise rims, at least one temple member connected to the rims, and at least one lens. The rims are configured to retain the lens with a portion of a perimeter edge of the lens positioned in a groove in the rims. A vent arrangement is provided between the lens and the rims. The vent arrangement includes an opening between the rims and the perimeter edge of the lens.

The above described features and advantages, as well as others, will become more readily apparent to those of ordinary skill in the art by reference to the following detailed description and accompanying drawings. While it would be desirable to provide an eyeglass frame that provides one or more of these or other advantageous features, the teachings disclosed herein extend to those embodiments which fall within the scope of the appended claims, regardless of whether they accomplish one or more of the above-mentioned advantages.

BRIEF DESCRIPTION OF THE DRAWINGS

FIG. 11 perspective view of the eyeglasses of FIG. 9 with the removable plug removed from the vent arrangement;

FIG. 12 is a cross-sectional view of the removable plug along lines XII-XII of FIG. 11;

DESCRIPTION

Figure 1:
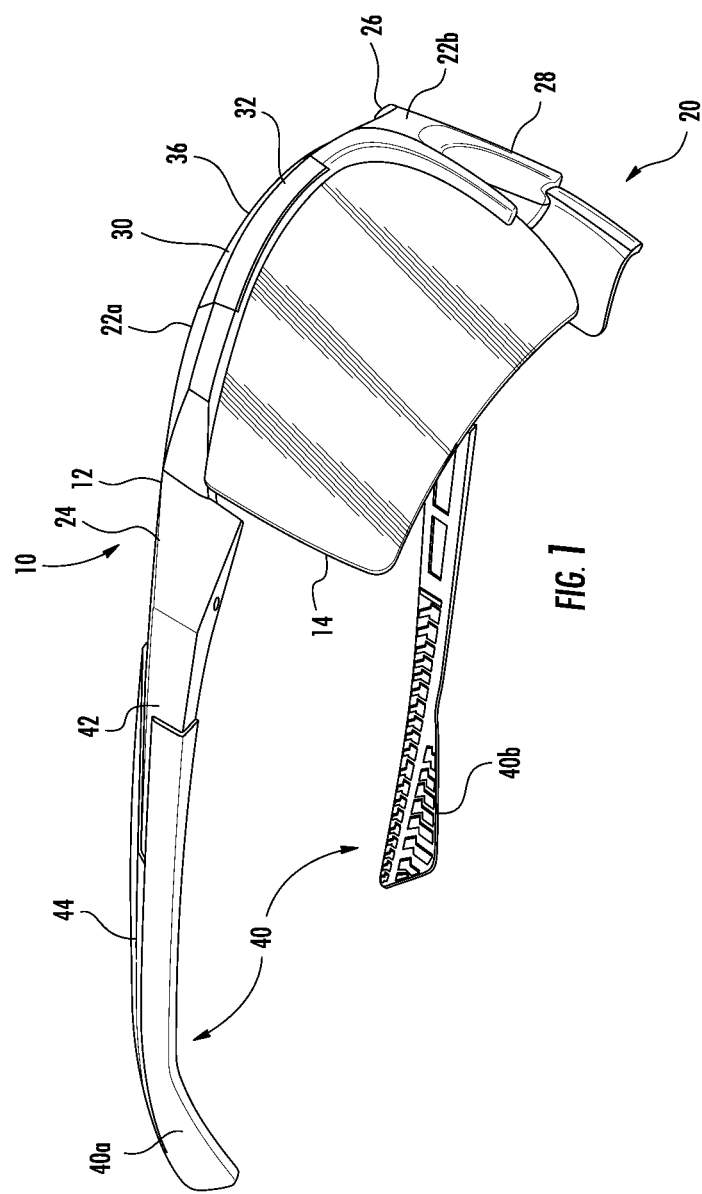
FIG. 1 is a right side perspective view of eyeglasses including a frame with a vent arrangement provided on a brow of the frame.

With reference to FIG. 1, in at least one embodiment, a set of eyeglasses 10 includes eyeglass frames 12 with a pair of lenses 14 supported by the frames 12. The frames 12 include a face member 20 and a pair of temple members 40 connected to the face member 20. The eyeglasses 10 also include a vent arrangement 50 with a dynamic vent adjustment member 51 that is moveable between an open and a closed position.

The face member 20 is configured to extend across the face of a wearer and retain the lenses 14 in position over the eyes of a wearer of the eyeglasses 10. The temple members 40 are configured to extend rearwardly from the face member 20 and rest on the ears of the wearer. Accordingly, the frames 12 are supported by the head of the wearer with the face member 20 engaging the nose of the wearer and the temple members 40 engaging the ears of the wearer.

The lenses 14 of the eyeglasses 10 may be provided as any of various lens types as will be recognized by those of ordinary skill in the art. Examples of different types of lenses include prescription and non-prescription lenses, darkened lenses, or lenses with any of various additional features such as shatter-proof lenses, glare-resistant lenses, polarized lenses, or any of various other types of lenses. If the lenses 14 are darkened or include light blocking features, the eyeglasses may be considered "sunglasses". In some embodiments, the lenses 14 may be transitional lenses that change from transparent to translucent/darkened when exposed to ultra-violet radiation. Although two lenses 14 are shown in the embodiment of FIG. 1, the eyeglass 10 may alternatively be configured to retain a unitary lens provided by a single piece of plastic or glass which covers both eyes of the wearer.

Figure 2:
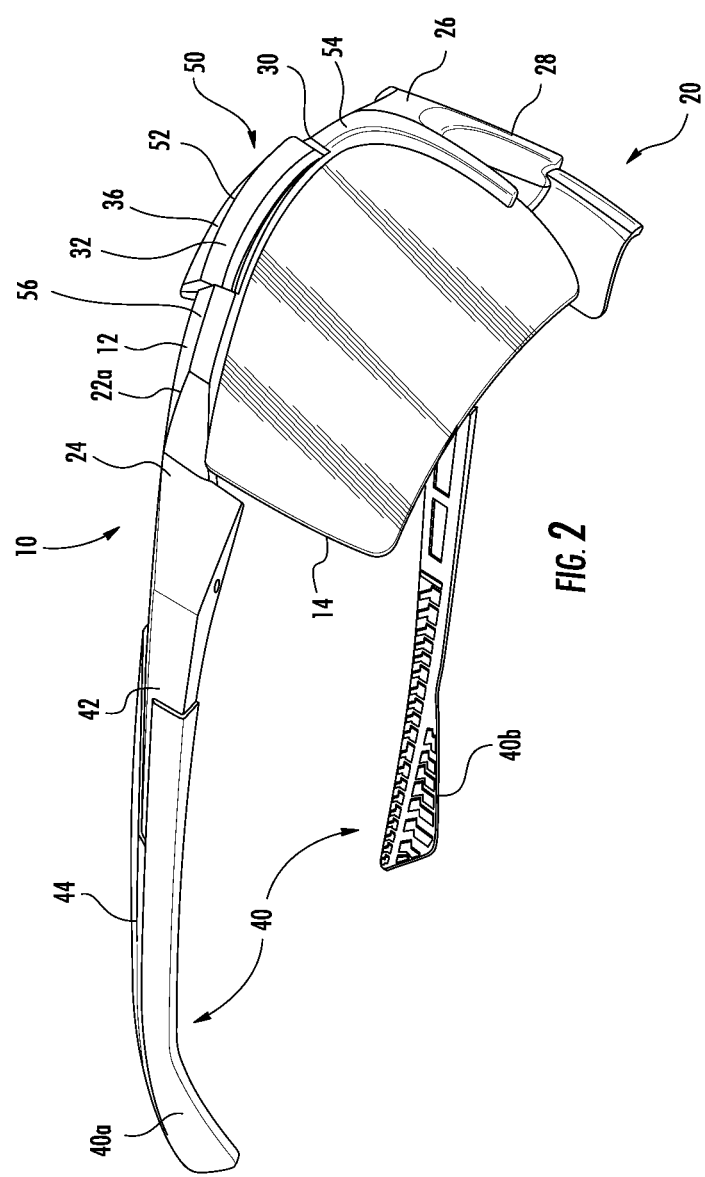
FIG. 2 is a right side perspective view of the eyeglasses of FIG. 1 with the vent arrangement in an open position.

The face member 20 includes a pair of rims 22, rim extension member 24 and a bridge 26. The rims 22 include a right rim 22a and a left rim 22b. As used herein, the singular term "rim 22" refers to either the right rim 22a or the left rim 22b, and the plural term "rims 22" refers to both the right rim 22a and the left rim 22b. The rims 22 are configured to retain the lenses 14. In the embodiment of FIGS. 1 and 2, each rim 22 is a partial rim that does not completely encircle the lens 14 retained by the rim 22. However, it will be recognized that, in alternative embodiments, the rims 22 may be a full rims that completely encircle the lenses.

With continued reference to FIG. 1, each rim 22 includes a brow 30 defined by the portion of the rim 22 extending over the lens 14. Each rim 22 further includes a front surface 32, a rear surface 34, an upper surface 36, and a central groove 38 (see FIG. 3) formed on the lower side of the brow between the front surface 32 and the rear surface 34. The central groove 38 is configured to receive one of the lenses 14. Each lens 14 is retained in the central groove 38 using any of various fastening means, such as an adhesive or a screw or other fastener, or some combination thereof. If a fastener is used, the fastener may extend through the rear surface 34 and the lens 14 and into the portion of the rim 22 that is forward of the central groove 38. Each lens 14 includes a cut-out or indentation 16 along the upper edge of the lens 14 in the area of the brow 30. Beside this indentation 16, the sides 18 of the lens extend upward into the rim 22. As explained in further detail below, the upper edge of the lens 14 at the indentation 16 is substantially flush with or slightly covered by the lower edge of the vent adjustment member 51 when in a downward position. However, the upper edge of the lens 14 at the indentation 16 is exposed when the vent adjustment member 51 is in an upward position.

The bridge 26 of the face member 20 is provided at a medial side of each rim 22. The bridge 26 includes a lower surface 28 that is contoured in an arch-like shape to curve around the nose of the wearer. The bridge 26 joins the right side rim 22a to the left side rim 22b. In the embodiment of FIGS. 1 and 2, the bridge 26 is provided as a unitary component with the rims 22. The unitary component may be molded or otherwise formed from any of various materials as will be recognized by those of ordinary skill in the art. For example, the rims 22 and the bridge 26 of the face member may be comprised of a thermoplastic polyamide based on aliphatic and cycloaliphatic blocks. In other exemplary embodiments, the rims 22 and the bridge 26 of the face member may be comprised of other materials, such as thermoplastic polyurethane or other polymer materials. A nose pad (not shown) may be coupled to the bridge 26 to rest on the nose of the wearer. The nose pad may be comprised of a resilient material having a lesser hardness than the rims 22 and bridge 26 such that the nose pad is comfortable against the skin of the wearer and helps secure the frames 12 in place on the face of the wearer.

The lateral side of each rim 22 is connected to a rim extension member 24. The rim extension member 24 is generally an enlarged portion of the frames 12 that is provided on the lateral sides of the face member 20 between the lenses 14 and the temple members 40. In at least some embodiments, a hinge (not shown) is provided at the rim extension member 24. The hinge allows the associated temple member 40 to pivot about a pivot axis defined by the hinge. It will be recognized that in certain other embodiments, the frames 12 may be configured without a hinge between the face member 20 and the temple members 40.

Two temple members 40 are connected to the face member 20. As used herein, the singular term "temple member 40" refers to either the right temple member 40a or the left temple member 40b, and the plural term "temple members 40" refers to both the right temple member 40a and the left temple member 40b. Each temple member 40 extends rearwardly from the face member 20 to a position configured to rest behind the ear of the wearer. Each temple member 40 is generally elongated in form and may include an end portion that curves either downward or inward, or both downward and inward. In the embodiment of FIG. 1, each temple member 40 includes a temple frame member in the form of an elongated temple column 42 and a temple overlay 44. The temple column 42 provides structural support for the temple arrangement and is configured to retain the temple overlay 44. The column 42 is comprised of a first material and the overlay 44 is comprised of a second material, the first material of the column 42 being harder and more rigid than the second material of the overlay 44.

The frames 12 of the eyeglasses 10 may be comprised of various materials with different qualities. For example, the rims 22 and temple column 42 may be comprised of a first material and the overlay 44 and nose pad may be comprised of a second material that having a lesser hardness (e.g., a lesser durometer) than the first material. For example, the first material may be a thermoplastic polyamide based on aliphatic and cycloaliphatic blocks and does not contain a plasticizer. The thermoplastic polyamide material may exhibit good heat resistance, excellent fatigue behavior, low moisture absorption and dimensional stability. One exemplary material that may be used as the first material is GRILAMID® TR 90. It will be recognized that various other materials may also be used as the first material. For example, in at least one embodiment, the first material is a nylon based polymer material. The second material may be provided by a thermoplastic elastomer (TPE) material such as a thermoplastic polyurethane (TPU). In other embodiments, the second material may be comprised of natural or synthetic rubber materials or any of various other polymer materials.

Dynamic Vent in Brow

With reference now to FIG. 2, a vent arrangement 50 is provided in the brow 30 directly above each lens 14. The vent arrangement 50 includes a moveable vent adjustment member 51 incorporated into a recess 53 in the brow 30. The recess 53 is provided between a medial portion 54 and a lateral portion 56 of the brow. In the embodiment disclosed herein, the vent adjustment member 51 includes a block 52 positioned in a forward portion of the brow and a seal 74 that is connected to a posterior side of the block 52. In other embodiments, the vent adjustment member may take other forms with one or more different components. As shown in FIGS. 1 and 2, the block 52 is configured to open or close a vent passage 99 (see FIG. 5B) that extends through the brow 30. When the block 52 is in a downward position, as shown in FIG. 1, the vent passage 99 is closed or obstructed. When the block 52 is in an upward position, as shown in FIG. 2, the vent passage 99 is open or unobstructed.

Figure 3:
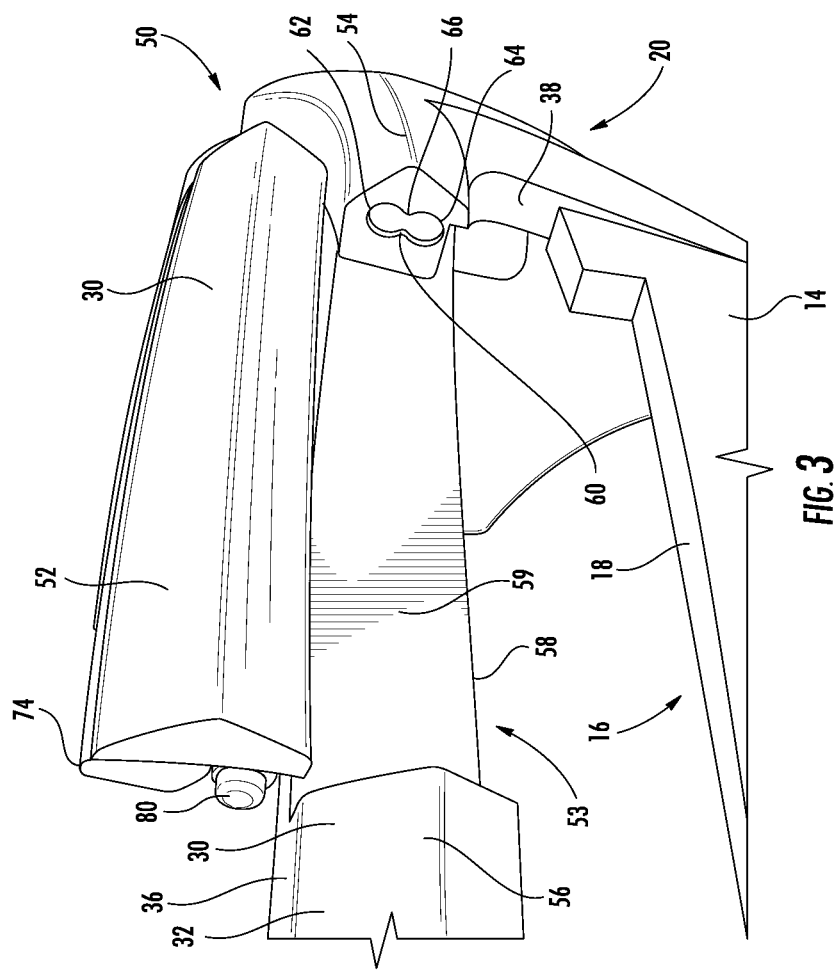
FIG. 3 is an exploded view of the vent arrangement of FIG. 1.

With reference now to FIG. 3, an exploded and enlarged view of the brow 30 is shown. The brow 30 includes the block 52 of the vent arrangement 50, the medial portion 54 provided on a medial side of the block 52, the lateral portion 56 provided on a lateral side of the block 52, and a posterior segment 58 provided on a posterior side of the block. The medial portion 54 of the brow is a substantially solid component extending from the front surface 32 to the posterior surface 34 of the rim 22. The medial portion 54 includes a medial groove 60 that faces the block 52. The medial groove 60 includes an enlarged upper recess 62 and an enlarged lower recess 64 separated by a neck 66. The upper recess 62 and the lower recess 64 are each rounded in shape. As a result, the perimeter of the medial groove 60 resembles an outline of the number "8".

Similarly, the lateral portion 56 is a substantially solid component extending from the front surface 32 to the posterior surface 34 of the rim 22. The shape of the front surface 32 of the rim 22 is substantially the same on both the medial portion 54 and the lateral portion 56 of the brow. The lateral portion 56 also includes a lateral groove (not shown) that faces the block 52 and is substantially identical in size and shape to the medial groove 60. As explained in further detail below, the medial groove 60 and the lateral groove together provide a track in which the block 52 rides when moving between the downward position (as shown in FIG. 1) and the upward position (as shown in FIG. 2).

With continued reference to FIG. 3, the block 52 is also a solid component configured to fit within the recess 53 in the brow between the medial portion 54 and the lateral portion 56 of the brow 30. The block 52 is positioned in the recess 53 above the lens 14 on the anterior side (which may also be referred to herein as a "forward" side) of the brow 30. The posterior segment 58 of the brow is positioned behind the block 52 on the posterior side (which may also be referred to herein as the "rearward side") of the brow 30. The block 52 has a width that extends across a portion of the brow a distance of about 1 cm to 4 cm. Larger or greater widths for the block 52 are possible, but it may be difficult for a user to move the block between the upward and downward positions with blocks that are smaller or greater in width.

Figure 4A:
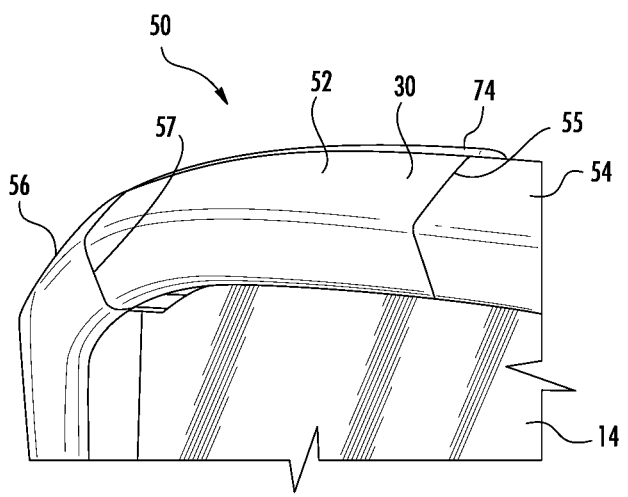
FIG. 4A is an enlarged perspective view of a brow of the eyeglasses of FIG. 2 with the vent arrangement in the closed position.
Figure 4B:
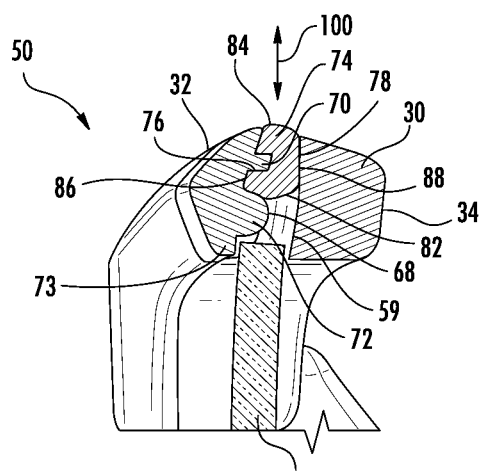
FIG. 4B is a cross-sectional view along line B-B of FIG. 4A showing the vent arrangement in the closed position.
Figure 5A:
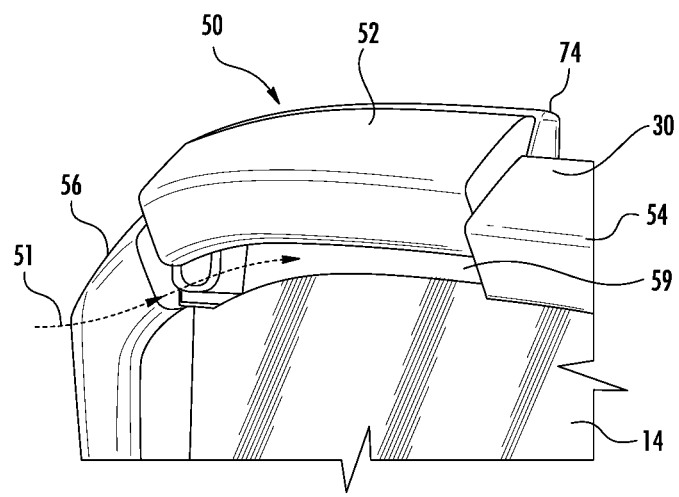
FIG. 5A is an enlarged perspective view of a brow of the eyeglasses of FIG. 2 with the vent arrangement in the open position.
Figure 5B:
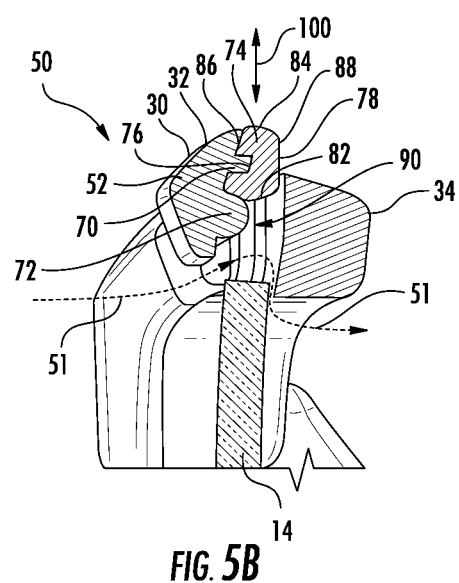
FIG. 5B is a cross-sectional view along line B-B of FIG. 5A showing the vent arrangement in the open position.

The block 52 extends rearwardly from the front surface 32 of the rim 22 to an intermediate surface 68 that faces the posterior segment 58 of the brow 30. The thickness of the block from the front surface 32 to the intermediate surface 68 is between about 3 mm and 7 mm. The shape of the front surface 32 of the rim 22 is substantially similar across the entire brow 30, including the medial portion 54, the block 52, and the lateral portion 56. In the embodiment disclosed herein, the front surface 32 of the rim 22 is substantially triangular in shape (i.e., as shown in FIG. 5B a triangle is formed by two lines defined by the angled surfaces extending from a forward apex on the front surface with the third line defined through the block and connecting the posterior edges of the front surface of the block 52). This triangular shape provides an arrow-dynamic form across the front surface of the brow 30. Additionally, the front surface of the block 52 is substantially flush with and aligned with the front surface of the medial portion 54 and the lateral portion 56 of the brow 30 when the block 52 is in the downward position, as shown in FIGS. 4A and 4B. As a result, the surface of the brow appears to be substantially continuous and generally uninterrupted when viewed from the face of the eyeglasses 10.

As best shown in FIG. 4B, the intermediate surface 68 of the block 52 (i.e., the surface opposite the front surface), is contoured and includes an upper rib 70 and a lower rib 72. The upper rib 70 and the lower rib 72 both extend horizontally across the intermediate surface 68 of the block 52. The upper rib 70 has a slightly smaller diameter and is slightly less rounded than the lower rib 72. As shown in FIG. 4B, the lower rib 72 is positioned directly above the lens 14 and is in relatively close proximity to the lens 14 when the block 52 is in the downward position. At the same time, a lower lip 73 of the block 52 extends downward past the upper edge of the lens 14 when the block 52 is in the downward position. Accordingly, the lower rib 72 and the lower lip 73 substantially cover the upper forward edge of the lens 14 when the block 52 is in the downward position. As a result, airflow over the upper edge of the lens 14 (and through the vent passage 99) is substantially blocked when the block 52 is in the downward position.

A seal 74 is retained on intermediate surface 68 of the block 52. The seal 74 includes a lower surface 82, an upper surface 84, an anterior-facing surface 86, and a posterior-facing surface 88. The seal 74 is generally elongated and extends laterally across the entire block. The lower surface 82 of the seal 74 is positioned in the middle portion of the block 52, with the lower surface 82 of the seal 74 engaging the lower rib 72 of the block 52. The seal extends upwardly from the lower surface 82 to the upper surface 84 as a substantially solid component. The upper surface 82 of the seal 74 is positioned slightly above the upper edge of the block 52 (e.g., between about 0.5 and 1 mm above the upper edge of the block 52).

The anterior-facing surface 86 of the seal 74 includes an elongated C-shaped cavity 76 designed and dimensioned to securely receive the upper rib 70. An adhesive or other bonding material may be provided in the C-shaped cavity to help maintain the placement of the seal 74 on the upper rib 70. The lower portion of the anterior-facing surface 86 is trapped between the upper rib 70 and the lower rib 72. Accordingly, the seal 74 engages both the upper rib 70 and the lower rib 72 on the intermediate surface 68 of the block 52. The posterior-facing surface 88 of the seal 74 includes a slightly-bowed sealing surface that engages a deflection surface 59 on the posterior segment 58 of the brow 30.

The seal 74 is generally comprised of a material having a lesser hardness than the block 52. For example, the seal 74 may be comprised of a rubber material or a thermoplastic elastomer material (such as the same material provided by the overlay 44), while the block 52 is comprised of a thermoplastic polyamide generally having a greater hardness than the seal 74 (such as the same material provided by other portions of the rim 22). The relatively soft and resilient material of the seal 74 allows the sealing surface 78 to closely engage the deflection surface 59 and block the passage of air between the sealing surface 78 and the deflection surface 59. Additionally, the relatively soft and resilient material of the seal 74 results in a surface with a relatively high coefficient of friction. As shown in FIG. 4B, when the block 52 is in the downward position, the seal 74 is pressed against the deflection surface 59, and the relatively high coefficient of friction of the seal resists upward movement of the block 52 while also dampening vibrations. Additionally, because the upper surface 82 of the seal 74 is positioned above the upper edge of the block 52, the seal may be used to engage the bill of a hat of the wearer, and further assist in stabilizing the eyeglasses 10 and the hat on the head of the wearer.

With continued reference to FIG. 4B, the deflection surface 59 is provided the posterior segment 58 of the brow 30 and defines the rear of the recess 53 in the brow 30. The deflection surface 59 is relatively smooth such that air is not disturbed when flowing over the deflection surface 59. The deflection surface 59 extends from the upper surface 36 of the brow 30 to a position behind the lens 14 on a lower surface of the brow. A thin channel 90 defines a relatively short distance between the deflection surface 59 and the lens 14. The channel 90 forms a part of the vent passage 99 and is sufficiently wide to allow air to flow through the channel 90. In at least one embodiment, the width of the channel (i.e., the distance between the deflection surface 59 and the lens 14) is between 0.5 mm and 3 mm, and is particularly about 1.5 mm. When the block 52 is in the downward position as shown in FIGS. 4A and 4B, the deflection surface 59 is substantially covered and is not exposed on the face of the eyeglasses 10.

With continued reference now to FIG. 4A, a first small seam 55 exists at the juxtaposition between the block 52 and the medial portion 54 of the brow, and a second small seam 57 exists at the juxtaposition between the block 52 and the lateral portion 56 of the brow. The first seam 55 and the second seam 57 are both provided by small voids/interrupted surfaces between the block 52 and the immediately adjacent medial and lateral portions 54 and 56 of the brow. These interrupted surfaces allow the block 52 to move relative to the medial and lateral portions 54 and 56. In particular, the block 52 is configured to move between the downward position of FIGS. 4A and 4B and the upward positions of FIGS. 5A and 5B, as noted by double-sided arrow 100.

With reference again to FIG. 3, the block 52 further includes a medial post (not shown) and a lateral post 80. The lateral post 80 is provided on the lateral side of the block 52 and is designed and dimensioned to slide in the lateral groove. In particular, the lateral post 80 is a cylindrical member that extends outwardly in a lateral direction on the lateral side of the block 52. In at least one embodiment, the lateral post extends outwardly between about 1 mm and 5 mm from the remaining surface on the lateral side of the block. The lateral post 80 is configured to ride within the lateral groove (which is substantially identical to the medial groove 60 shown in FIG. 3) in the lateral portion 56 of the brow 30. The medial post is substantially identical to the lateral post 80 and engages the medial groove 60 in the medial portion 54 of the brow 30.

When the block 52 is in the downward position, as shown in FIGS. 4A and 4B, the medial post and lateral post 80 are positioned within and substantially fill the lower recesses of the associated groove (e.g., medial groove 60). The necks 66 are dimensioned to retain the medial post and the lateral post 80 in the lower recesses unless a sufficient upward force in excess of a threshold force is provided on block 52 to force the medial post and the lateral post 80 through the necks 66 and into the upper recesses of the associated groove (e.g., upper recess 62 of the medial groove 60). When the wearer or other third party provides the sufficient upward force (which may be referred to herein as a "vent adjustment force") on the block 52, the block 52 is moved to the upward position as shown in FIGS. 5A and 5B. After the block 52 is moved to the upward position, the necks 66 are dimensioned to retain the medial post and the lateral post 80 in the upper recesses unless the vent adjustment force is provided on block 52 in a downward direction in order to force the medial post and the lateral post 80 through the necks 66 and into the lower recesses of the associated groove (e.g., lower recess 64 of the medial groove 60).

With reference now to FIGS. 5A-5B, when the block 52 is in the upward position, the front surface of the block 52 is offset from the front surface on the medial portion 54 and the lateral portion 56 of the brow 30. In particular, the front surface of the block 52 is positioned above the front surface of the medial portion 54 and the lateral portion 56 of the brow 30. As a result, the front surface 32 of the brow is interrupted with the block 52 no longer substantially flush and substantially continuous when the block 52 is in the upward position. As shown in FIG. 5B, the lower lip 73 of the block is directly above the lens 14 in this position, but the lower lip is in relatively distant proximity to the lens 14 when the block 52 is in the upward position (of FIG. 5B) as compared to the downward position (of FIG. 4B).

Figure 6:
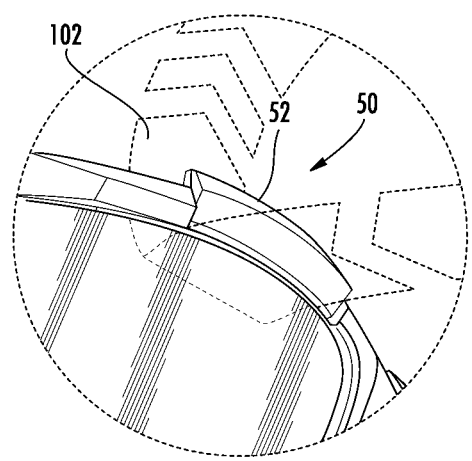
FIG. 6 is a perspective view of the vent arrangement of FIG. 1 showing airflow through the vent arrangement when the wearer is moving in a forward direction.
Figure 7:
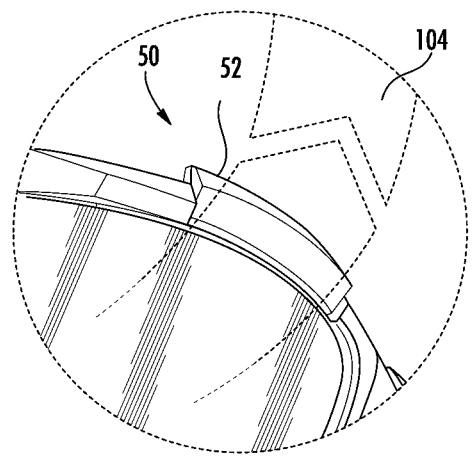
FIG. 7 is a perspective view of the vent arrangement of FIG. 1 showing heat transfer through the vent arrangement when a wearer is stationary.

The wearer of the eyeglasses is provided with the option of placing the vent arrangement and the associated vent passage 99 in the open or closed positions. When the block 52 is in the upward position, the vent passage 99 is generally open and unobstructed, and air is allowed to flow through the vent passage 99. In this position, a substantial portion of the deflection surface 59 is exposed to the face of the eyeglasses. When the wearer is participating in a fast-moving sporting event, a significant amount of airflow through the eyeglasses is possible if the wearer moves the block 52 to the upward position. As shown in FIG. 6, air directed onto the face of the eyeglasses (noted by airflow 102) during forward movement of the wearer will flow between the block 52 and the lens 14, strike the deflection surface 59, and flow across the rear surface of the lens 14. Alternatively, when the wearer is more stationary, heat is allowed to escape from the rear surface of the lenses. As shown in FIG. 7, if air is not directed onto the face of the eyeglasses, heated air (noted by airflow 104) from behind the lens 14 will tend to flow up the deflection surface, between the lens 14 and the block 52, and over the front surface of the brow 30.

When the block 52 is in the downward position, the vent arrangement 50 is closed, and air is substantially blocked from passing through the associated vent passage 99. In order to move the vent passage from the open to the closed position, the wearer simply places one finger on the top surface of the block 52 and the thumb on the bottom perimeter of the lens 14 (or the frames 12) and applies a sufficient downward force on the block 52 (i.e., a vent adjustment force) to move the block 52 to the downward position on the brow. This vent adjustment force is sufficient to force the medial post and the lateral post 80 through the necks 66 and into the lower recesses 64 of the associated groove 60. When the wearer or other third party provides the sufficient downward force on the block 52, the block 52 is moved from the upward position as shown in FIGS. 5A and 5B to the downward position of FIGS. 4A and 4B. After the block 52 is moved to the downward position, the necks 66 are dimensioned to retain the medial post and the lateral post 80 in the lower recesses of the grooves 60. At the same time, the seal 74 is engaged with the deflection surface 59 which helps maintain the block 52 in place on the brow 30 and dampens any vibration of the block 52 that may be experienced during activity of the wearer.

While the vent arrangement 50 has been described herein as being arranged in the brow 30 of the frames 12, it will be recognized that other embodiments are also contemplated wherein the vent arrangement is located elsewhere in the frames 12. For example, in at least one embodiment, the vent arrangement 50 may be located in the frames 12 at the side of the face member 20 or at the bottom of the face member 20.

Alternative Embodiment with Side Vent

Figure 9:
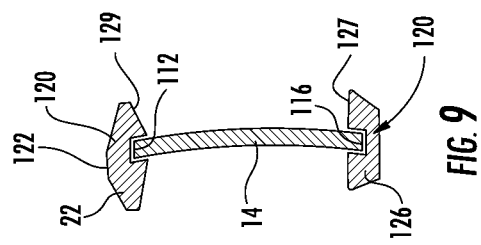
FIG. 9 is a cross-sectional view of the eyeglasses along line IX-IX of FIG. 9.
Figure 8:
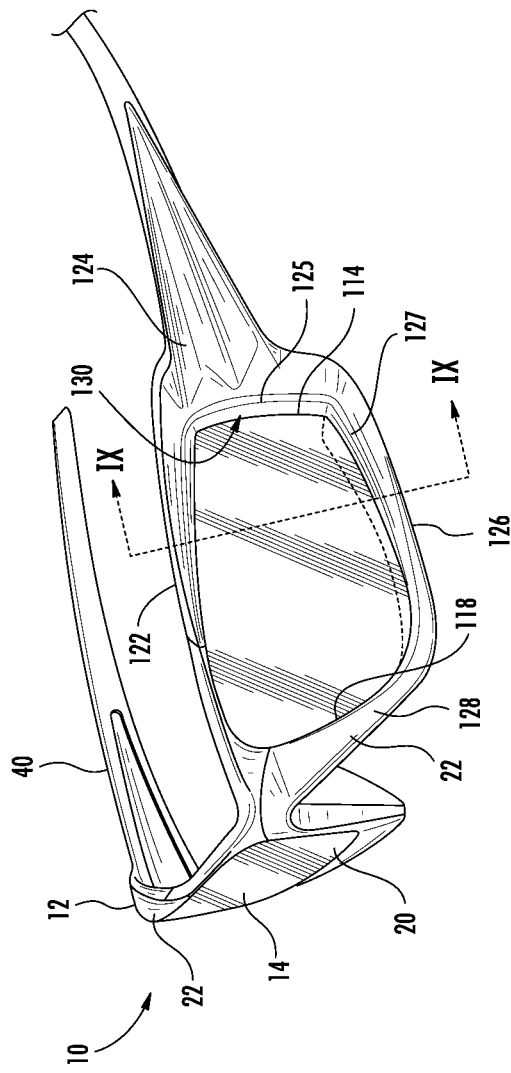
FIG. 8 is a perspective view of an alternative embodiment of eyeglasses with a vent arrangement formed between a lateral side of the rims and a lateral perimeter edge of the lens.

With reference now to FIGS. 8-9, in at least one alternative embodiment, a vent arrangement 50 is provided in the frames 12 at the sides of the face member 20 adjacent to the lenses 14. The vent arrangement 50 is formed by an opening 130 between a lateral side of the rims 22 and the lateral perimeter edge of the lens 14.

Similar to previous described embodiments, in the embodiment of FIGS. 8-9, the frames 12 include rims 22 with temple members 40 extending from the rims 22. Each rim 22 is configured to retain a lens 14. Each lens has a shape defined by a perimeter edge 110. In the embodiment of FIG. 8, the perimeter edge is substantially trapezoidal and includes an upper perimeter edge 112, a lateral perimeter edge 114, a lower perimeter edge 116, and a medial perimeter edge 118. However, it will be recognized that the lens may have any of various other shapes such as substantially rectangular, circular, oval, or any of various other shapes. While the transitions between the upper perimeter edge 112, lateral perimeter edge 114, lower perimeter edge 116 and medial perimeter edge 118 are clearly defined and distinct with generally polygonal shapes such as trapezoidal shapes, the transitions are more gradual and ambiguous with other shapes that are more circular. However, even with a circular shaped lens the upper, lower, lateral and medial perimeter edges may nevertheless be reasonably defined in various manners, such as by splitting the circular perimeter into four 90° arcs.

With continued reference to FIGS. 8-9, each rim 22 includes an upper side 122, a lateral side 124, a lower side 126, and a medial side 128. A groove 120 configured to receive the lens 14 extends along the upper side 122, lower side 126 and medial side 128 of the rims 22. Accordingly, the lens 14 is embedded in the groove in the upper side 122, lower side 126 and medial side 128 of the rims 22. However, the groove 120 does not extend along the lateral side 124 of the rims 22. Instead, the lateral side 124 of the rims 22 is substantially smooth along the inner surface 125 (i.e., the surface that faces the lateral perimeter edge 114 of the lens 14). Accordingly, the lateral perimeter edge 114 of the lens 14 is not embedded in the groove 120.

An opening 130 is provided in the eyeglasses 10 between the lateral perimeter edge 114 of the lens 14 and the inner surface 125 of the lateral side 124 of the rims 22. In the embodiment of FIGS. 8-9, the opening extends along the entire lateral side 124 of the rims from the upper side 122 to the lower side 126 of the rims 22. The opening 130 provides a vent that allows air to flow through the opening 130 between the lateral perimeter edge 114 of the lens 14 and the lateral side 124 of the rims 22. The opening 130 is particularly configured to allow air to flow through the opening 130 when the wearer is in forward motion. Air flowing through the opening 130 also draws air from behind the lens laterally and rearwardly in the direction of the temple members 40.

In the embodiment of FIGS. 8-9, the lower side 126 of the rims 22 includes an upward facing surface 127 (which may also be referred to as an inner facing surface). The upward facing surface 127 is thicker than the inner facing surface on the lateral side 124 and the medial side 128 of the rims 22. The upward facing surface 127 extends from a mid-region of the lens 14 (i.e., a position between the medial perimeter edge 118 and the lateral perimeter edge 114 of the lens, such as a position near a median line between the medial perimeter edge 118 and the lateral perimeter edge 114). The upward facing surface 127 is generally tapered toward the mid region of the lens. In other words, the upward facing surface 127 becomes gradually wider moving from the mid-region of the lens 14 to the lateral perimeter edge 114 of the lens 14. A downward facing surface 129 is provided on the upper side 122 of the rims 22 that mirrors or is substantially similar in width dimensions to the upward facing surface 127 on the lower side 126 of the rims 22.

Alternative Embodiment with Removable Plug

Figure 10:
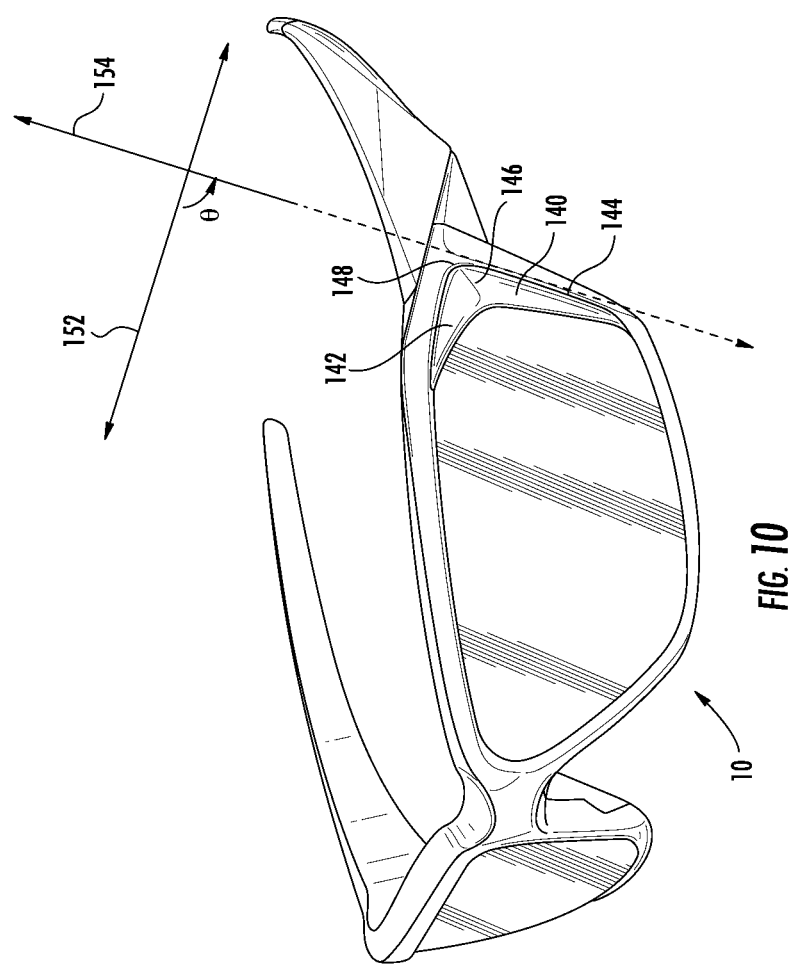
FIG. 10 is a perspective view of an alternative embodiment of eyeglass of FIG. 8 further comprising a removable plug positioned in the vent arrangement.

With reference now to FIGS. 10-12, an alternative embodiment of the eyeglasses of FIGS. 8-9 is shown. In this embodiment, the eyeglasses 10 further include a removable plug 140 positioned in the opening 130 of the vent arrangement. The removable plug 140 is designed and dimensioned to completely fill the opening and extend between the lateral perimeter edge 114 of the lens 14 and the lateral side 124 of the rims 22 while also extending from the upper side 122 of the rims 22 (and the upper perimeter edge 112 of the lens 14) to the lower side 126 of the rims 22 (and the lower perimeter edge 116 of the lens 14).

The removable plug 140 is generally comprised of a flexible and resilient material having hardness that is substantially less than the hardness of the material used to form the rims 22. In at least one embodiment, the material for the plug 140 may be provided by a thermoplastic elastomer (TPE) material such as a thermoplastic polyurethane (TPU). In other embodiments, the plug 140 may be comprised of natural or synthetic rubber materials or any of various other polymer materials. Because the removable plug 140 is resilient and flexible, it may be easily and repeatedly inserted into the opening 130 and removed from the opening 130.

The removable plug 140 generally has the same shape as the opening 130. In the embodiment of FIGS. 10-12, the removable plug has a boomerang-like shape and includes an upper front surface 142 and a lower front surface 144. The upper front surface 142 and the lower front surface are both generally triangular in shape and the two surfaces meet along a medial line 146. An apex 148 is formed along the medial line. The apex 148 is defined by the intersection of a first line (represented by parallel line 152) along the upper front surface 142 and a second line (represented by line 154) along the lower front surface 144 of the removable plug 140. In the embodiment of FIGS. 10-12, the intersection of these two lines forms an interior angle θ that is greater than 75° but less than 150°.

Because the shape of the removable plug 140 is configured to fit within the opening, boomerang-like shape generally matches the shape of the opening 130, including the contours of the perimeter edge of the lens 14 and the lateral side 124 of the rims 22. Accordingly, as shown in FIG. 11, the lateral perimeter edge 114 of the lens 14 may be considered as including an upper angled segment 113 and a lower angled segment 115. Alternatively, the upper angled segment 113 may be considered to be part of the upper perimeter edge 112 of the lens 14, while the lower angled segment 115 is considered to be part of the lateral perimeter edge 114. In any event, in the embodiment of FIGS. 10-12, an apex 111 is formed at the transition between the upper angled segment 113 and the lower angled segment 115. Similar to the apex 148, the apex 111 is defined by an angle formed by the intersection of two lines extending along the upper angled segment 113 and the lower angled segment 115. In the embodiment of FIGS. 10-12, the angle is greater than 75° and less than 150°. In at least one embodiment, the angle is between 90° and 125°.

With particular reference to FIGS. 11 and 12, the removable plug 140 includes a front surface 160 and a rear surface 162. The front surface 160 is generally more curved and angled relative to the flatter rear surface 162. A groove 164 is formed about the perimeter of the plug 140 between the front surface 160 and the rear surface 162. The groove 164 is configured to receive and engage the lateral perimeter edge 114 of the lens 14 and the lateral side 124 of the rims 22 such that the removable plug 140 is retained securely within the opening 130. Forward lips 166 and rearward lips 168 are formed about the perimeter of the removable plug 140. Because the perimeter lips (including forward lips 166 and rearward lips 168) are thinner than the more central portions of the plug 140, the lips 166 and 168 are generally more flexible and more easily manipulated by the user than more central portions of the plug 140.

As noted previously, the material used to form the plug 140 is relatively flexible and resilient. This allows the user to either (i) remove the plug 140 from the opening 130, thus opening the vent arrangement for airflow, or (ii) insert the plug 140 in the opening 130 to completely covering the opening 130 thus closing the vent arrangement and blocking airflow through the opening 130.

Alternative Embodiment with Shutter

Figure 13A:
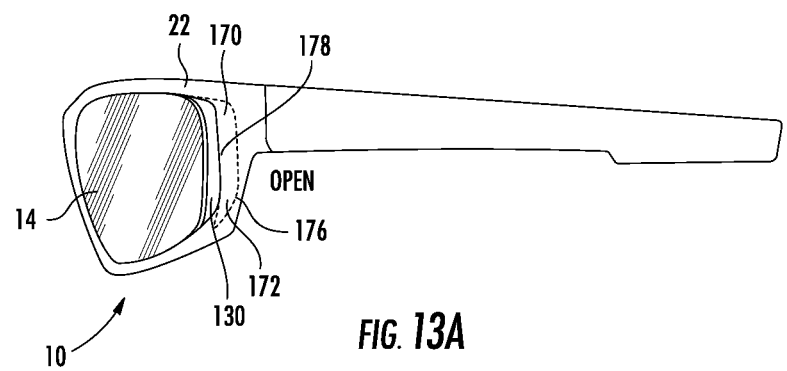
FIG. 13A is a side view of an alternative embodiment of the eyeglasses of FIG. 8 with a sliding shutter in an open position.
Figure 13B:
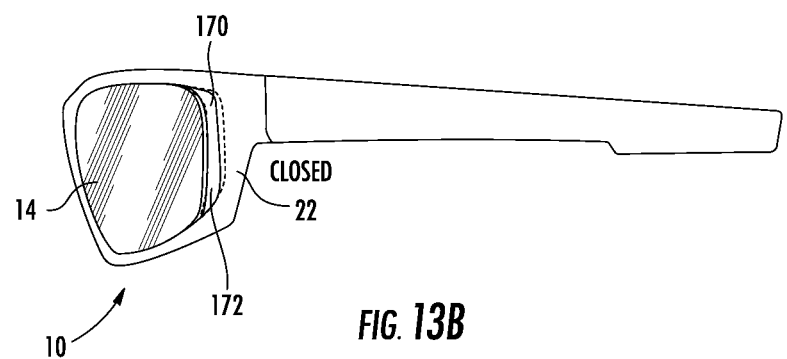
FIG. 13B is a side view of an the eyeglasses of FIG. 13B with the shutter in the closed position.
Figure 14A:
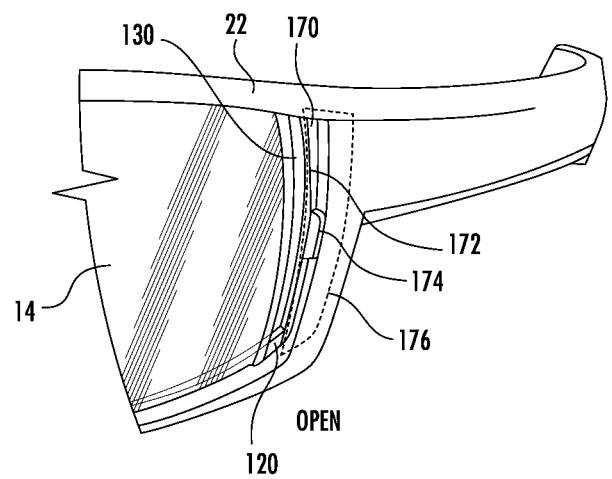
FIG. 14A is a front view of the eyeglasses of FIG. 13A with the shutter in the open position.
Figure 14B:
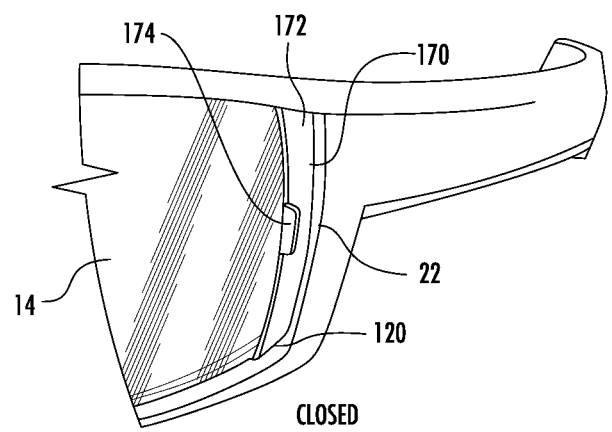
FIG. 14B is a front view of the eyeglasses of FIG. 13A with the shutter in the closed position.

With reference now to FIGS. 13A-14B, an alternative embodiment of a vent arrangement for the eyeglasses 10 is shown. In this embodiment, the eyeglasses 10 include a shutter 170 positioned in the opening 130 of the vent arrangement. The shutter 170 includes a panel 172 and a tab 174. The shutter 170 is configured to slide within the opening 130 between an open position as shown in FIGS. 13A and 14A, and a closed position as shown in FIGS. 13B and 14B.

The panel 172 is a plate-like member having a cross-sectional size and shape that is similar to the lateral edge of the lens 14. Accordingly, the panel 14 appears as an extension of the lateral edge of the lens 14, extending between the lens 14 and the rims 22. The panel is designed and dimensioned to completely fill the opening 130 and extend between the lateral perimeter edge 114 of the lens 14 and the lateral side 124 of the rims 22. In addition, the panel 172 also extends from the upper side 122 of the rims 22 (and the upper perimeter edge 112 of the lens 14) to the lower side 126 of the rims 22 (and the lower perimeter edge 116 of the lens 14).

The tab 174 is a short protrusion that extends outward from the surface of the panel 172. The tab 174 is designed and dimensioned to be engaged by a human fingertip and allow the user to slide the shutter 170 between the open and closed positions. The tab 174 may extend outward from the panel 172 a distance that is about the same as the thickness of a human fingernail. Accordingly, the user may bring his or her fingernail into abutment with the tab 174 and apply a force against the tab in order to move the shutter 170 toward either the open or closed positions. In the embodiment of FIGS. 14A and 14B, the tab 174 is positioned on the outer side of the panel 172. However, in other embodiments, the tab 174 may be positioned on the inner side of the panel 172.

The shutter 170 is configured to slide into a pocket 176 on the lateral side of the rims 22, thus concealing most of the shutter 170 when the shutter is in the closed position. The pocket 176 is formed in the lateral side of the rims and is designed and dimensioned to receive most of the panel with the tab 174 remaining outside of the pocket 176 to allow the user to return the shutter 170 to the closed position. The perimeter pocket is illustrated in FIGS. 13A and 14A by dotted lines. Because the panel 172 is approximately the same thickness as the lens 14, the pocket 176 is about the thickness as the groove 120 that retains the lens 14. In lieu of a pocket 176, the shutter 170 may be concealed on the rear surface of the rims 22 when the shutter is in the open position or in a recess behind the rims.

In operation, a user wearing the eyeglasses 10 with the shutter 170 may easily open or close the vent arrangement by simply engaging his or her finger with the tab 174. If the user wishes to open the vent arrangement, the user applies a sufficient force against the tab 174 in the lateral direction (as indicated by arrow 178) to cause the shutter 170 to slide into the pocket 176 and expose the opening 130 between the lens 14 and the lateral side of the rims 22. On the other hand, if the user wishes to close the vent arrangement, the user applies a sufficient force against the tab 174 in the medial direction to cause the shutter 170 to slide out of the pocket 176 and cover the opening 130 between the lens 14 and the lateral side of the rims 22. Accordingly, the user is provided with a dynamic vent arrangement that may be easily adjusted between the open and closed positions.

While the shutter 170 has been described as sliding between the open and closed positions in the embodiment disclosed herein, it will be recognized that the shutter may also be configured to open and close in different manners. For example, the shutter may be provided as a hinged member that pivots relative to a pivot axis. In at least one embodiment, the shutter 170 may be provided as a louver having a pivot axis that is substantially vertical and substantially parallel to the lateral perimeter edge 114 of the lens 14 and the lateral side of the rims 22. Such a pivot axis may also be positioned between the lateral perimeter edge 114 of the lens 14 and the lateral side of the rims 22. In another embodiment, the pivot axis for the shutter 170 may be provided along the lateral perimeter edge 114 of the lens 14 or along the lateral side of the rims 22.

In at least one exemplary alternative embodiment, the shutter 170 may be positioned at a different location on the eyeglasses other than the lateral perimeter edge 114 of the lens 14. For example, the shutter 170 could be configured to slide into the brow 30 of the eyeglasses 10, or be configured to pivot along a horizontal axis that is substantially parallel to the brow 30.

In yet another alternate embodiment, the shutter 170 could include more automated or semi-automatic features that allow the shutter to move between the open and closed position. For example, the shutter 170 could be spring loaded when in the open or closed positions. This spring loaded arrangement may include a locking mechanism such that the shutter is moved between the open and closed positions by toggling a switch or button. For example, the spring loaded arrangement with locking mechanisms could be similar to those arrangements found in ball-point pens wherein a button on the pen is depressed in order to move the pen between the open and closed positions.

The foregoing detailed description of one or more exemplary embodiments of the vent arrangement for eyeglass frames has been presented herein by way of example only and not limitation. It will be recognized that there are advantages to certain individual features and functions described herein that may be obtained without incorporating other features and functions described herein. Moreover, it will be recognized that various alternatives, modifications, variations, or improvements of the above-disclosed exemplary embodiments and other features and functions, or alternatives thereof, may be desirably combined into many other different embodiments, systems or applications. Presently unforeseen or unanticipated alternatives, modifications, variations, or improvements therein may be subsequently made by those skilled in the art which are also intended to be encompassed by the appended claims. Therefore, the spirit and scope of any appended claims should not be limited to the description of the exemplary embodiments contained herein.

What is claimed is:

1. Eyeglasses comprising:
   at least one lens with a perimeter edge, the perimeter edge including an upper perimeter edge, a lateral perimeter edge, a lower perimeter edge, and a medial perimeter edge;
   rims configured to retain the at least one lens with the upper perimeter edge of the at least one lens engaging the rims; at least one temple member connected to the rims;
   a vent arrangement provided between the lens and the rims, the vent arrangement including an opening between a lateral side of the rims and the lateral perimeter edge of the lens, the opening dimensioned to allow air to flow through the opening between the lateral perimeter edge of the lens and the lateral side of the rims; and
   an obstruction removably positioned in the opening, wherein air is permitted to flow through the opening when the obstruction is removed from the opening, and wherein the air is blocked from flowing through the opening when the obstruction is positioned in the opening.

2. The eyeglasses of claim 1 wherein the obstruction is a removable plug positioned in the opening of the vent arrangement and extending between the lateral side of the rims and the lateral perimeter edge of the lens.

3. The eyeglasses of claim 2 wherein the removable plug further extends between the upper perimeter edge of the lens and the lower perimeter edge of the lens when the removable plug is positioned in the opening.

4. The eyeglasses of claim 2 wherein the rims are comprised of a first material and the removable plug is comprised of a second material, the first material having a greater hardness than the second material.

5. The eyeglasses of claim 2 wherein the removable plug includes a medial groove configured to engage the lateral perimeter edge of the lens and a lateral groove configured to engage the lateral side of the rims.

6. The eyeglasses of claim 2 wherein the removable plug includes a front surface and a rear surface, the front surface angled relative to the rear surface.

7. The eyeglasses of claim 1 wherein the lateral perimeter edge of the lens includes an upper angled segment and a lower angled segment with an apex between the upper angled segment and the lower angled segment.

8. The eyeglasses of claim 7 wherein the upper angled segment and the lower angled segment form an angle between 90° and 125°.

9. The eyeglasses of claim 1, the rims further including an upper side and a lower side, the upper perimeter edge of the lens embedded in the upper side of the rims, and the lower perimeter edge of the lens embedded in the lower side of the rims, wherein the opening extends along an entire lateral side of the rims from the upper side to the lower side of the rims.

10. The eyeglasses of claim 9, the rims including an upward facing surface on the lower side of the rims, the upward facing surface extending from a mid-region of the lens to the opening between the lateral side of the rims and the lateral perimeter edge of the lens.

11. The eyeglasses of claim 1 wherein the obstruction is a moveable shutter positioned in the opening of the vent arrangement and extending between the lateral side of the rims and the lateral perimeter edge of the lens.

12. Eyeglasses comprising:
at least one lens with a perimeter edge, the perimeter edge including an upper perimeter edge, a lateral perimeter edge, a lower perimeter edge, and a medial perimeter edge;
rims configured to retain the at least one lens, the rims including a lateral side and an upper side, the rims further including a groove configured to receive the lens, the groove extending along the upper side of the rims such that the upper perimeter edge of the lens is positioned in the groove, the groove not extending along the lateral side of the rims such that the lateral perimeter edge of the lens is not positioned in the groove;
at least one temple member connected to the rims;
an opening between the lateral side of the rims and the lateral perimeter edge of the lens; and
an obstruction removably positioned in the opening, wherein air is permitted to flow through the opening when the obstruction is removed from the opening, and wherein the air is blocked from flowing through the opening when the obstruction is positioned in the opening.

13. The eyeglasses of claim 12 wherein the opening extends from the upper side to a lower side of the rims.

14. The eyeglasses of claim 13 wherein the groove extends along the lower side and a medial side of the rims, the lower perimeter edge and the medial perimeter edge of the lens positioned in the groove.

15. The eyeglasses of claim 13, the lower side including a tapered upward facing surface on the lower side of the rims, the tapered upward facing surface extending from the lateral side of the rims to a mid-region on the lower side of the lens.

16. The eyeglasses of claim 12 wherein the obstruction is a resilient plug removably positioned in the opening and completely covering the opening.

17. Eyeglasses comprising:
at least one lens with a perimeter edge;
rims configured to retain the at least one lens with a portion of the perimeter edge of the lens positioned in a groove in the rims;
at least one temple member connected to the rims; and
a vent arrangement provided between the lens and the rims, the vent arrangement including an opening between the rims and the perimeter edge of the lens and an obstruction removably positioned in the opening, wherein air is permitted to flow through the opening when the obstruction is removed from the opening, and wherein the air is blocked from flowing through the opening when the obstruction is positioned in the opening.

18. The eyeglasses of claim 17 wherein the obstruction is a removable plug positioned in the opening between the rims and the perimeter edge of the lens.

19. The eyeglasses of claim 17 wherein the obstruction is a movable shutter positioned in the opening between the rims and the perimeter edge of the lens.

20. The eyeglasses of claim 19 wherein the moveable shutter is configured to slide into a pocket in the rims.

\* \* \* \* \*